(12) United States Patent
Keh et al.

(10) Patent No.: US 11,396,114 B2
(45) Date of Patent: Jul. 26, 2022

(54) METHOD FOR SEPARATING AND RECYCLING A WASTE POLYESTER-COTTON TEXTILE BY MEANS OF A HYDROTHERMAL REACTION CATALYZED BY AN ORGANIC ACID

(71) Applicant: THE HONG KONG RESEARCH INSTITUTE OF TEXTILES AND APPAREL LIMITED, Hong Kong (CN)

(72) Inventors: Edwin Yee Man Keh, Hong Kong (CN); Lei Yao, Hong Kong (CN); Xiao Liao, Hong Kong (CN); Yang Liu, Hong Kong (CN); Kevin Cheuk, Hong Kong (CN); Alex Chan, Hong Kong (CN)

(73) Assignee: The Hong Kong Research Institute of Textiles and Apparel Limited, Hong Kong (CN)

( * ) Notice: Subject to any disclaimer, the term of this patent is extended or adjusted under 35 U.S.C. 154(b) by 258 days.

(21) Appl. No.: 16/645,453

(22) PCT Filed: Sep. 8, 2017

(86) PCT No.: PCT/CN2017/101109
§ 371 (c)(1),
(2) Date: Mar. 6, 2020

(87) PCT Pub. No.: WO2019/047174
PCT Pub. Date: Mar. 14, 2019

(65) Prior Publication Data
US 2020/0262108 A1 Aug. 20, 2020

(51) Int. Cl.
*C08J 11/26* (2006.01)
*B29B 17/02* (2006.01)

(52) U.S. Cl.
CPC .............. *B29B 17/02* (2013.01); *C08J 11/26* (2013.01); *B29B 2017/0224* (2013.01); *B29B 2017/0289* (2013.01)

(58) Field of Classification Search
USPC ............ 521/48; 428/372, 375; 528/271, 272
See application file for complete search history.

(56) References Cited

U.S. PATENT DOCUMENTS

| 3,937,671 A | 2/1976 | Gruntfest et al. |
| 2012/0284931 A1* | 11/2012 | Jenkins ................. D06F 35/006 8/137 |

FOREIGN PATENT DOCUMENTS

| CN | 101111548 A | * | 1/2008 |
| CN | 101111548 A | | 1/2008 |
| CN | 106674588 A | | 5/2017 |
| CN | 212741613 | * | 7/2021 |
| JP | 405171525 A | * | 7/1993 |

OTHER PUBLICATIONS

CN101111548 A Machine Translation Wataru Ando and Akihiko Oouchi Method and apparatus for screening cellulosic polymer (Year: 2008).*
International Search Report and Written Opinion received in PCT Application No. PCT/CN2017/101109, dated Jun. 4, 2018 (Engl. Translation of ISR only).

* cited by examiner

*Primary Examiner* — Terressa Boykin
(74) *Attorney, Agent, or Firm* — Wolf, Greenfield & Sacks, P.C.

(57) ABSTRACT

A method for separating and recycling a waste polyester-cotton textile by a hydrothermal reaction catalyzed by an organic acid, comprising the following steps: dividing a waste polyester-cotton textile into fragments and dispersing in an aqueous solution system of the organic acid catalyst to obtain a mixed system; in a high-pressure reactor, heating the mixed system to 110~180° C. so that cotton fibers in the waste polyester-cotton textile undergo a degradation reaction for 0.5~3 h to obtain a mixture; and filtering the mixture by a sieve, washing to obtain a polyester fiber aggregate, and then filtering the remaining portion by a filtration membrane in vacuum so as to obtain cotton fiber fragments after washing. Embodiments of the present disclosure may provide advantages for the separation, recycling and reuse of waste polyester-cotton textiles. For example, the catalyst used during processing is derived from nature and is biodegradable.

19 Claims, 5 Drawing Sheets

METHOD FOR SEPARATING AND RECYCLING A WASTE POLYESTER-COTTON TEXTILE BY MEANS OF A HYDROTHERMAL REACTION CATALYZED BY AN ORGANIC ACID

CROSS-REFERENCE TO RELATED APPLICATION

This application is based upon and claims priority to PCT patent application No. PCT/CN2017/101109, filed on Sep. 8, 2017, the entire content of which is incorporated herein by reference for all purposes.

TECHNICAL FIELD

The present disclosure relates to the field of textile resource regeneration, and particularly to a method for separating and recycling a waste polyester-cotton textile by means of a hydrothermal reaction catalyzed by an organic acid.

BACKGROUND

As the world's population continues to increase coupled with rapid changes in fashion trends, more and more waste textile products have been created. Polyester fiber is one of the most commonly used fibers, especially for the manufacture of polyester-cotton blended textiles, etc. However, polyester fiber is a kind of material that is difficult to degrade naturally, and it is easy to have an adverse impact on the environment after being discarded. From the perspective of environmental protection and resource conservation, recycling is one of the most ideal ways to deal with this type of waste.

To achieve a perfect recycling effect, the first thing is to properly separate the two different kinds of fibers in the waste polyester-cotton textile. In this regard, chemical method will achieve more complete and thorough separation and recovery than physical method. The chemical method is mainly to convert one of the fibers into a soluble substance through chemical degradation or modification reaction, or to use a corresponding solvent for selective dissolution directly, to achieve complete fiber-to-fiber separation. But there is no denying that it has some shortcomings either way in current technology, including the use of more harmful chemicals, for example: hydrochloric acid (U.S. Pat. No. 4,345,039) and tetramethylene sulfone (U.S. Pat. No. 5,342,854), etc. Or including the use of large and expensive solvents, for example: NMMO, Ionic liquid (WO Patent No. 2014081291 A1), and DMT (CN Patent No. 2014081291 A1), etc. These problems inevitably burden the cost control and environmental protection.

SUMMARY OF THE INVENTION

The purpose of the present disclosure is to address the deficiency of the existing polyester-cotton textile recycling technology by using an organic acid as a catalyst in combination with the hydrothermal reaction to separate and recycle a waste polyester-cotton textile, the organic acid is derived from nature and is biodegradable, and not polluting the environment once again.

To achieve the above purpose, the present disclosure provides a method for separating and recycling a waste polyester-cotton textile by means of a hydrothermal reaction catalyzed by an organic acid, comprising the following steps:

dividing a waste polyester-cotton textile into fragments and dispersing in an aqueous solution system of an organic acid catalyst to obtain a mixed system;

heating the mixed system to 110~180° C. in a high-pressure reactor so that cotton fibers in the waste polyester-cotton textile undergo a degradation reaction for 0.5~3 h to obtain a mixture; and filtering the mixture by means of a sieve, washing to obtain a polyester fiber aggregate, and then filtering the remaining portion by means of a filtration membrane in vacuum so as to obtain cotton fiber fragments after washing.

According to some embodiments, the organic acid is methanesulfonic acid, oxalic acid, tartaric acid, citric acid, malic acid, formic acid, or acetic acid, preferably methanesulfonic acid, oxalic acid, or citric acid.

According to some embodiments, a content of the polyester in the polyester-cotton textile is 1%~99% by weight.

According to some embodiments, a content of the organic acid catalyst in the aqueous solution system is 0.1%~30% by weight, preferably 0.5%—10% by weight.

According to some embodiments, a solid-liquid ratio of the mixed system is 1:30~1:200 by weight, preferably 1:50~1:150 by weight.

According to some embodiments, the mixed system is heated under stirring, and the heating rate is 4° C./min~6° C./min.

According to some embodiments, a spontaneous pressure is formed after heating the mixed system, and the spontaneous pressure is 0.10 MPa~1 MPa.

According to some embodiments, further comprising: drying the polyester fiber aggregate and the cotton fiber fragment respectively in a blast oven to constant weight.

According to some embodiments, further comprising: converting the polyester fiber aggregate through mechanical action into a fiber raw material for spunning again.

According to some embodiments, further comprising: recycling the cotton fiber fragment as a raw material for cellulose production.

Compared with the prior art, the processing procedure of the method for separating and recycling a waste polyester-cotton textile by means of a hydrothermal reaction catalyzed by an organic acid is advanced and simple, and the catalyst used during processing is derived from nature and is biodegradable, not decomposing during processing, and not polluting the environment once again; the present invention may effectively achieve the separation, recycling and reuse of waste polyester-cotton textiles.

DETAILED DESCRIPTION

The technical solution of the present disclosure is further described below according to specific embodiments. The scope of the present disclosure is not limited to the following embodiments, the embodiments are listed for illustrative purposes only and do not limit the present disclosure in any way.

According to the present disclosure, the method for separating and recycling a waste polyester-cotton textile is achieved by using a hydrothermal reaction catalyzed by an organic acid, comprising the following steps:

dividing a waste polyester-cotton textile into fragments and dispersing in an aqueous solution system of an organic acid catalyst to obtain a mixed system;

heating the mixed system to 110~180° C. in a high-pressure reactor so that cotton fibers in the waste polyester-cotton textile undergo a degradation reaction for 0.5~3 h to obtain a mixture; and filtering the mixture by means of a sieve, washing to obtain a polyester fiber aggregate, and then filtering the remaining portion by means of a filtration membrane in vacuum so as to obtain cotton fiber fragments after washing.

Figure 1:
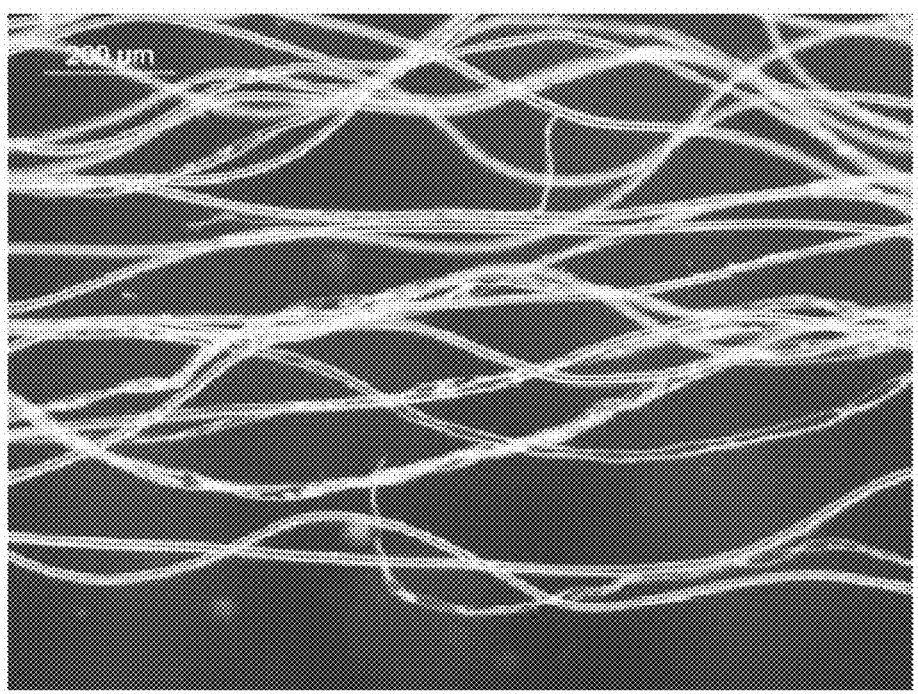
FIG. 1 is a scanning electron microscope image of a waste polyester-cotton textile before processing.
Figure 2:
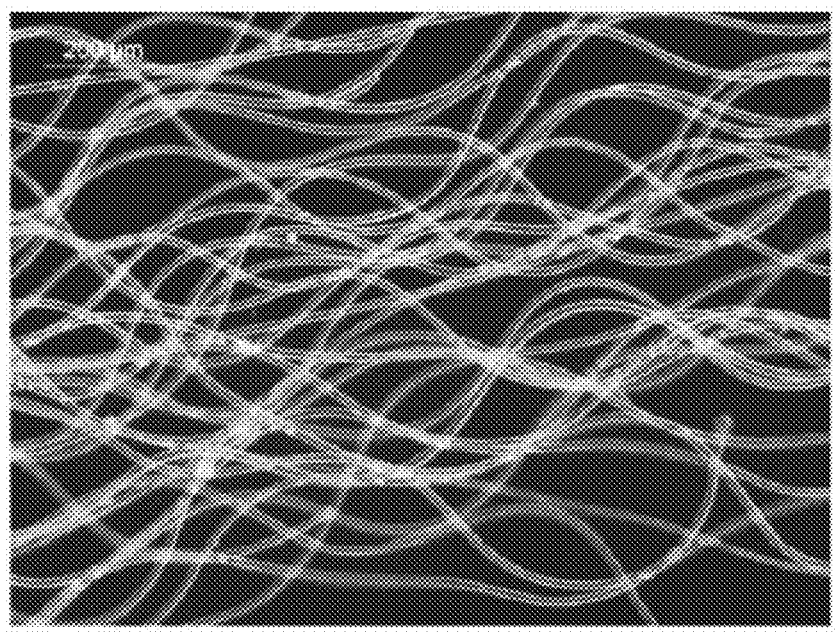
FIG. 2 is a scanning electron microscope image of a polyester fiber aggregate obtained after processing in the method of the present disclosure.
Figure 3:
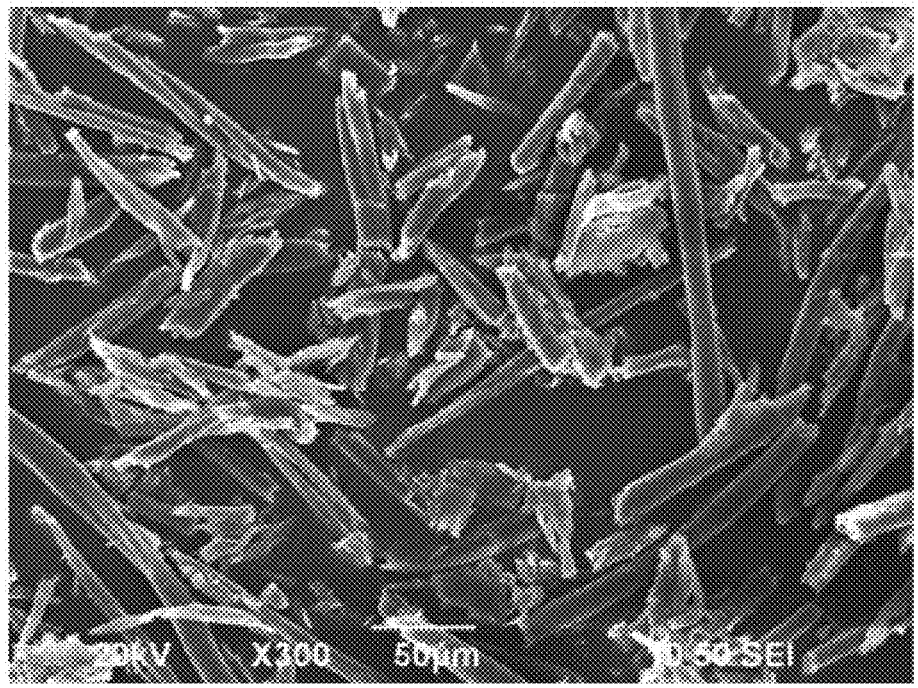
FIG. 3 is a scanning electron microscope image of a cotton fiber obtained after processing in the method of the present disclosure.
Figure 4:
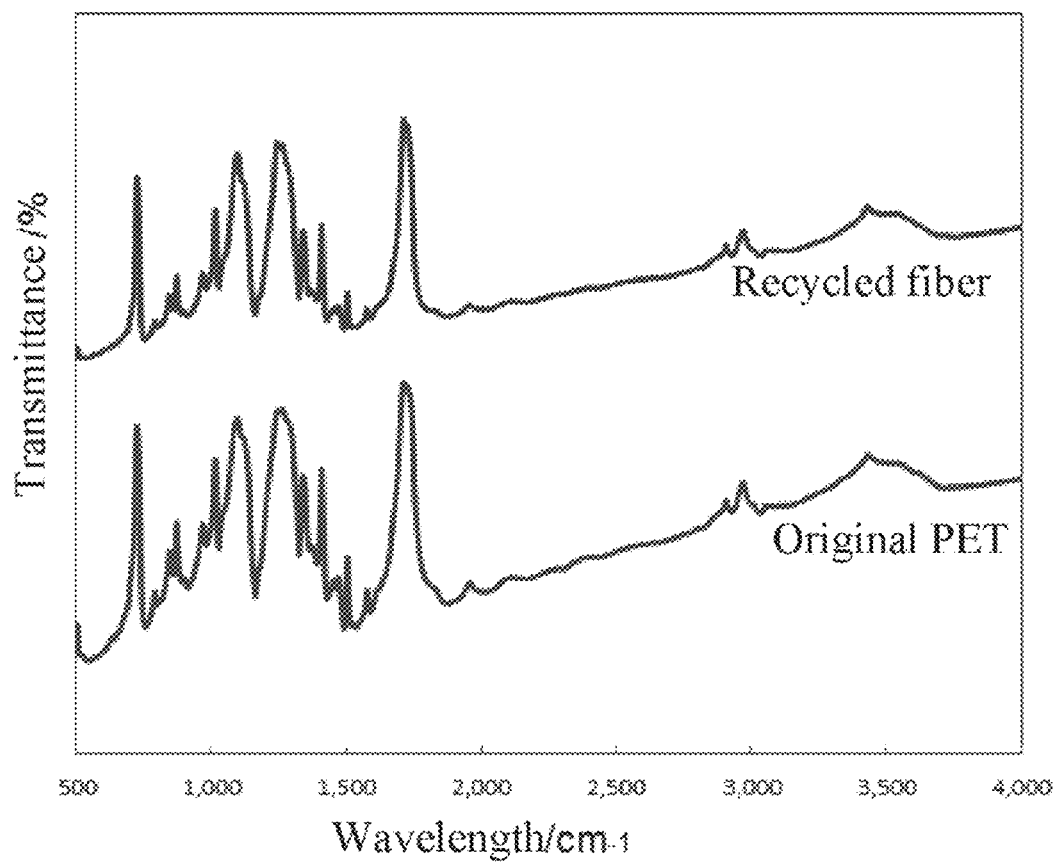
FIG. 4 is a comparison chart of Fourier transform infrared spectroscopy (FTIR) analysis of a polyester fiber before and after processing.
Figure 5:
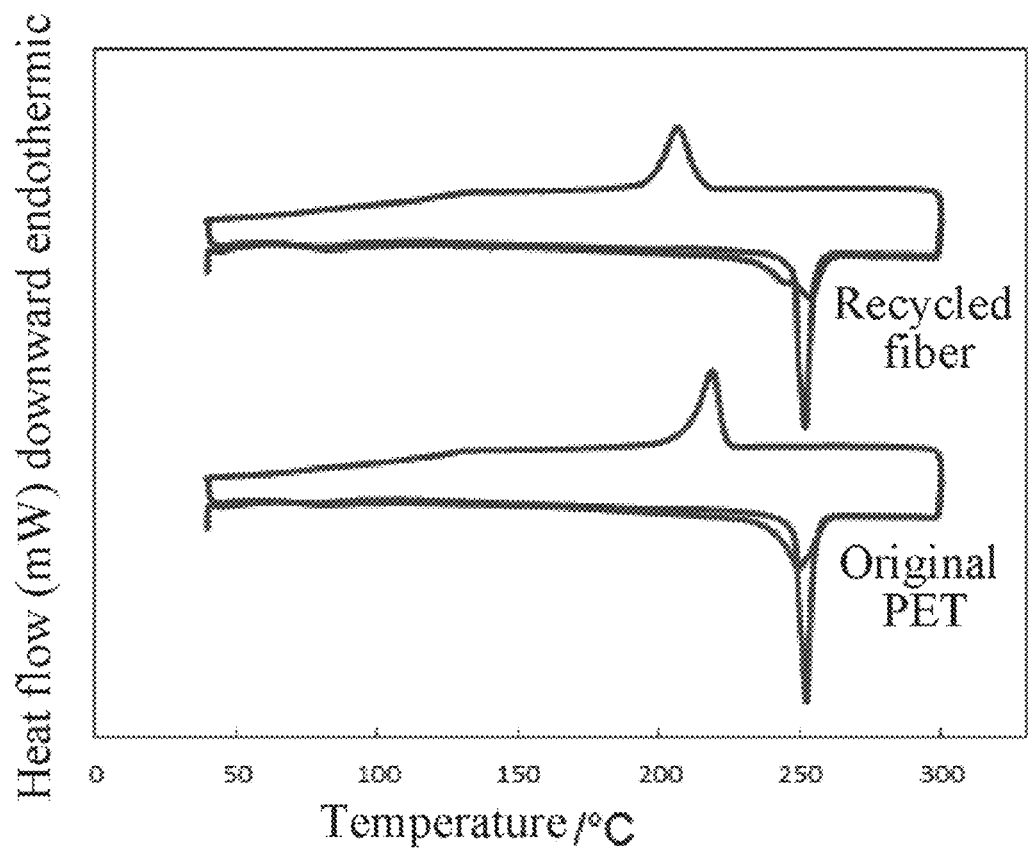
FIG. 5 is a comparison chart of differential scanning calorimetry (DSC) of a polyester fiber before and after processing.

FIG. 1 is a scanning electron microscope image of waste polyester cotton textile before processing, as shown in FIG. 1, in the method for separating and recycling a waste polyester-cotton textile according to the present disclosure, polyester-cotton textile is a fabric made by blending polyester and cotton fibers into yarn, the waste polyester-cotton textile may contain polyester in any proportion. According to the present disclosure, the content of the polyester in the waste polyester-cotton textile is preferably 1%~99% by weight, which is suitable for most polyester-cotton textiles.

Dividing a waste polyester-cotton textile into fragments may be done by cutting or shredding, etc. The size of the divided fragments depends on the specific production conditions.

The "organic acid" mentioned in the present disclosure refers to a natural acid derived from nature and biodegradable. It will not decompose during the process of separating and recycling the waste polyester-cotton textile and will not cause secondary pollution to the environment, such as methanesulfonic acid, oxalic acid, tartaric acid, citric acid, malic acid, formic acid, or acetic acid, preferably methanesulfonic acid, oxalic acid, or citric acid.

The aqueous solution system of an organic acid catalyst is an aqueous solution composed of the organic acid (as a catalyst for subsequent degradation reaction) and water. Wherein the content of the organic acid as a catalyst is 0.1%~30% by weight, preferably 0.5%~10%. High content of the organic acid rill accelerate the degradation reaction and shorten the required reaction time. In addition, the high content also helps to break down thicker or more tightly structured clothing.

After dispersing the waste polyester-cotton textile fragments into the aqueous solution system of the organic acid catalyst, a mixed system of solid-liquid coexistence is obtained. Solid-liquid ratio of the mixed system is 1:30~200 by weight, preferably 1:50~150 by weight. If the solid-liquid ratio is small, the reaction is relatively fast, and vice versa.

In order to degrade the cotton fibers in the waste polyester-cotton textile, the mixed system is placed in a sealed high pressure reactor. The mixed system is heated to 110° C.~180° C. for 0.5 h~3 h under stirring, and the heating rate is 4° C./min~6° C./min, a spontaneous pressure (that is, a pressure difference between the inside and outside of the high pressure reactor) is formed, and the spontaneous pressure is 0.10 MPa~1 MPa.

Under the subcritical hydrothermal conditions, the cotton fibers may undergo degradation reactions, while the polyester fibers are not affected, Degraded cotton fibers are stripped from the textile in the form of fragments, thereby separating the cotton fibers and the polyester fibers. Higher temperature or longer reaction time may result in smaller-sized cotton fiber fragments.

After separating the cotton fibers and the polyester fibers, the polyester fibers and the cotton fibers are recycled by filtration, comprising the steps of: filtering the mixture through a sieve (e.g. a 20 mesh screen) to obtain a polyester fiber aggregate after washing, then filtering the remaining portion (a remaining mixed solution after filtration) through a filter membrane, e.g. PTFE in vacuum to obtain cotton fiber fragments after washing.

After obtaining the polyester fiber aggregate and cotton fiber fragments, they may further be dried respectively in a blast oven to constant weight, and then weighed to calculate the yield.

As shown in FIGS. 2-5, Through scanning electron microscope (SEM), Fourier transform infrared spectroscopy (FTIR), differential scanning calorimetry (DSC) and analysis of recycled yield, it is found that the recycle rate of the polyester fiber aggregate is more than 95% in the product recycled in the method of the present disclosure, and the product recycled does not contain cellulose, chemical properties are basically retained. The product recycled may be opened and carded by machine (such as opener, blower, carder, etc.) to become a fiber raw material that can be spun again to realize the recycling of polyester fiber; while the recycle rate of the cotton fiber fragments is more than 80%, and it also does not contain polyester fiber. The cotton fiber fragments can be reused as raw material for cellulose production, such as entering a pulp mill as a raw material for papermaking.

In addition, the method of the present disclosure does not involve the use of more harmful chemicals, nor does it require the use of large amounts of more expensive solvents. Instead, water is used as the reaction medium, and the amount of catalyst used is very small, which may contribute to reduce fiber recycling costs, improve production efficiency and achieve true "green" recycling of polyester-cotton textile.

Unless otherwise defined, terms used in the present disclosure are generally understood by those skilled in the art.

The present disclosure will be further described with reference to the following embodiments.

EXAMPLES

The chemical reagents used in the following examples are commercially available products and are of analytical grade unless otherwise specified. The operation or instruments used in the following examples are common operations or instruments in the field unless otherwise specified. The proportions, ratios, and contents described in the following examples are by weight unless otherwise specified.

Example 1

15 g of waste white shirt uniform with a polyester/cotton ratio of 65/35 is placed in 1.8 L of an aqueous solution with 5% citric acid content. The high pressure reactor is heated to 130° C. at a heating rate of 5° C./min and maintained for 1.5 h for the degradation reaction of cotton fibers under stirring.

Turn off the electric heater after the reaction is over, open the reactor and take out the reaction product after the reactor is cooled to room temperature.

The reaction product is filtered through a sieve to obtain a polyester fiber aggregate, and the remaining mixed solution is vacuum-filtered through a filter membrane to obtain a cotton fiber fragment. Then the polyester fiber aggregate and cotton fiber fragments are washed and dried to constant weight in a blast oven. The recycle rate of the polyester fiber aggregate obtained is 98%, and the recycle rate of the cotton fiber fragments is 83%.

Example 2

17 g of waste bed sheet with a polyester/cotton ratio of 20/80 is placed in 1.5 L of an aqueous solution with 1% methanesulfonic acid content. The high pressure reactor is heated to 140° C. at a heating rate of 6° C./min and maintained for 1 h for the degradation reaction of cotton fibers.

Turn off the electric heater after the reaction is over, open the reactor and take out the reaction product after the reactor is cooled to room temperature.

The reaction product is filtered through a sieve to obtain a polyester fiber aggregate, and the remaining mixed solution is vacuum-filtered through a filter membrane to obtain a cotton fiber fragment. Then the polyester fiber aggregate and cotton fiber fragments are washed and dried to constant weight in a blast oven. The recycle rate of the polyester fiber aggregate obtained is 99%, and the recycle rate of the cotton fiber fragments is 81%.

In summary, the processing procedure of the method for separating and recycling a waste polyester-cotton textile by means of a hydrothermal reaction catalyzed by an organic acid is advanced and simple, and the catalyst used during processing is derived from nature and is biodegradable, not decomposing during processing, and not polluting the environment; the present invention may effectively achieve the separation, recycling and reuse of waste polyester-cotton textiles.

The foregoing description of the embodiments is to facilitate those skilled in the art to understand and apply the present disclosure. It will be apparent to those skilled in the art that various modifications can be easily made to these embodiments and the general principles described herein can be applied to other embodiments without creative effort. Therefore, the present disclosure is not limited to the embodiments herein. According to the present disclosure, the improvements and modifications made by those skilled in the art without departing from the scope of the present disclosure should all fall within the protection scope of the present disclosure.

What is claimed is:

1. A method comprising:
dividing a waste polyester-cotton textile into fragments and dispersing in an aqueous solution system of an organic acid catalyst to obtain a mixed system;
heating the mixed system to 110~180° C. in a high-pressure reactor so that cotton fibers in the waste polyester-cotton textile undergo a degradation reaction for 0.5~3 h to obtain a mixture, wherein the mixed system is heated under stirring at a heating rate of 4° C./min~6° C./min; and
filtering the mixture by means of a sieve, washing to obtain a polyester fiber aggregate, and then filtering the remaining portion by means of a filtration membrane in vacuum so as to obtain cotton fiber fragments.

2. The method according to claim 1, wherein the organic acid is methanesulfonic acid, oxalic acid, tartaric acid, citric acid, malic acid, formic acid, or acetic acid.

3. The method according to claim 1, wherein a content of the polyester in the polyester-cotton textile is 1%~99% by weight.

4. The method according to claim 1, wherein a content of the organic acid catalyst in the aqueous solution system is 0.1%~30% by weight.

5. The method according to claim 1, wherein a solid-liquid ratio of the mixed system is 1:30~1:200 by weight.

6. The method according to claim 1, wherein a spontaneous pressure is formed after heating the mixed system, and the spontaneous pressure is 0.10 MPa~1 MPa.

7. The method according to claim 1, further comprising:
washing and drying the polyester fiber aggregate and the cotton fiber fragments respectively in a blast oven to constant weight.

8. The method according to claim 1, further comprising: converting the polyester fiber aggregate through mechanical action into a fiber raw material for spunning again.

9. The method according to claim 1, further comprising: recycling the cotton fiber fragments as a raw material for cellulose production.

10. A method comprising:
dividing a waste polyester-cotton textile into fragments;
dispersing the fragments in an aqueous solution system in a presence of an organic acid catalyst to obtain a mixed system;
heating the mixed system in a high-pressure reactor to obtain a mixture, wherein the mixed system is heated under stirring at a heating rate of 4° C./min~6° C./min; and
filtering the mixture to obtain a polyester fiber aggregate and cotton fiber fragments.

11. The method according to claim 10, wherein a temperature for heating the mixed system is 110~180° C.

12. The method according to claim 11, wherein heating the mixed system is performed such that cotton fibers in the waste polyester undergo a degradation reaction.

13. The method according to claim 11, wherein heating the mixed system is performed for 0.5~3 h to obtain the mixture.

14. The method according to claim 10, wherein filtering the mixture comprises filtering the mixture through a sieve.

15. The method according to claim 14, further comprising filtering a remaining portion through a filtration membrane in vacuum to obtain the cotton fiber fragments.

16. The method according to claim 10, further comprising:
washing the polyester fiber aggregate and the cotton fiber fragments; and
drying the polyester fiber aggregate and the cotton fiber fragments respectively in a blast oven to constant weight.

17. The method according to claim 10, further comprising: converting the polyester fiber aggregate through mechanical action into a fiber raw material.

18. The method according to claim 17, further comprising spinning the fiber raw material.

19. A method comprising:

dividing a waste polyester-cotton textile into fragments and dispersing in an aqueous solution system of an organic acid catalyst to obtain a mixed system;

heating the mixed system to 110~80° C. in a high-pressure reactor so that cotton fibers in the waste polyester-cotton textile undergo a degradation reaction for 0.5~3 h to obtain a mixture;

filtering the mixture by means of a sieve, washing to obtain a polyester fiber aggregate, and then filtering the remaining portion by means of a filtration membrane in vacuum so as to obtain cotton fiber fragments; and washing and drying the polyester fiber aggregate and the cotton fiber fragments respectively in a blast oven to constant weight.

\* \* \* \* \*